US010110721B2

(12) United States Patent
Bai et al.

(10) Patent No.: US 10,110,721 B2
(45) Date of Patent: Oct. 23, 2018

(54) WIRELESS-ENABLED CONSUMER PORT APPARATUS FOR ACCOMMODATING AFTER-MARKET DEVICES FLEXIBLY IN VEHICLES

(71) Applicant: GM GLOBAL TECHNOLOGY OPERATIONS LLC, Detroit, MI (US)

(72) Inventors: Fan Bai, Ann Arbor, MI (US); Dan Shan, Troy, MI (US); Lakshmi V. Thanayankizil, Rochester Hills, MI (US); John Sergakis, Bloomfield Hills, MI (US); David P. Pop, Garden City, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/395,967

(22) Filed: Dec. 30, 2016

(65) Prior Publication Data
US 2018/0191888 A1    Jul. 5, 2018

(51) Int. Cl.
H04M 1/725    (2006.01)
H04B 1/3822   (2015.01)
H04W 8/00     (2009.01)

(52) U.S. Cl.
CPC ...... *H04M 1/72527* (2013.01); *H04B 1/3822* (2013.01); *H04W 8/005* (2013.01)

(58) Field of Classification Search
CPC . H04M 1/72527; H04B 1/3822; H04W 8/005
USPC ...................................................... 455/557
See application file for complete search history.

(56) References Cited

U.S. PATENT DOCUMENTS

| 7,437,304 | B2 * | 10/2008 | Barnard | ............. | G06Q 10/063 705/30 |
| 7,774,495 | B2 * | 8/2010 | Pabla | ............. | H04W 8/005 455/432.2 |
| 7,933,792 | B2 * | 4/2011 | Barnard | ............. | G06Q 10/063 705/30 |
| 8,044,782 | B2 * | 10/2011 | Saban | ............. | B60N 2/002 340/438 |

(Continued)

*Primary Examiner* — Hai V Nguyen
(74) *Attorney, Agent, or Firm* — Tiffany N. Logan; Parks IP Law LLC

(57) ABSTRACT

A vehicle system, for implementation at a subject vehicle, including a vehicle storage component having a device-discovery module that, when executed by a vehicle processing unit, determines, using vehicle communication hardware, presence of non-subject-vehicle devices. The storage component also includes a service-discovery module that, when executed, uses the communication hardware in determining needs of various devices including any of the non-subject-vehicle devices and any vehicle device. The storage component also includes a resource-discovery module that, when executed, determines what resources amongst the various devices available to serve the needs determined. The component also includes a grouping module that, when executed, establishes one or more groups amongst the various devices, yielding grouped devices of the various devices. The storage may also include a role-assignment module, a maintenance module, a soft-state-refresh module, and a broker module including an auction-and-bid protocol. The technology may include simply the storage device having any mentioned module, and processes performed.

20 Claims, 8 Drawing Sheets

(56) References Cited

U.S. PATENT DOCUMENTS

| | | | |
|---|---|---|---|
| 8,491,170 B2* | 7/2013 | Rodriguez Barros | B60R 1/1207 362/494 |
| 8,600,830 B2* | 12/2013 | Hoffberg | G06Q 30/0207 705/14.71 |
| 8,818,275 B2* | 8/2014 | Khamharn | G06F 13/105 455/41.2 |
| 8,819,182 B2* | 8/2014 | Howarter | G06F 17/30017 348/148 |
| 9,053,516 B2* | 6/2015 | Stempora | G06Q 40/08 |
| 9,123,082 B2* | 9/2015 | Hu | G06Q 50/06 |
| 9,144,094 B2* | 9/2015 | Bhamidipati | H04N 21/42207 |
| 9,275,093 B2* | 3/2016 | Pandey | H04L 67/12 |
| 9,294,459 B2* | 3/2016 | Baade | H04L 63/08 |
| 9,307,395 B2* | 4/2016 | Chien | H04W 8/186 |
| 9,439,232 B2* | 9/2016 | Thanayankizil | H04W 76/15 |
| 9,602,349 B2* | 3/2017 | John Archibald | G06F 1/3206 |
| 9,681,365 B2* | 6/2017 | Gupta | H04W 48/16 |
| 9,716,978 B2* | 7/2017 | Sankaran | H04W 4/21 |
| 9,727,156 B2* | 8/2017 | Kim | G06F 3/0416 |
| 9,787,817 B2* | 10/2017 | Wakita | H04M 1/72527 |
| 9,792,445 B2* | 10/2017 | Martini | G06F 21/60 |
| 9,813,436 B2* | 11/2017 | Moeller | H04W 4/029 |
| 9,813,932 B2* | 11/2017 | Otomo | H04L 67/12 |
| 9,818,136 B1* | 11/2017 | Hoffberg | G06Q 30/0282 |
| 9,821,704 B2* | 11/2017 | Fendt | B60Q 1/085 |
| 9,832,119 B2* | 11/2017 | Imamura | H04L 45/70 |
| 9,843,992 B2* | 12/2017 | Thangarasa | H04W 76/14 |
| 9,992,233 B2* | 6/2018 | Wood | H04L 63/20 |
| 2004/0162871 A1* | 8/2004 | Pabla | H04W 8/005 709/201 |
| 2008/0201227 A1* | 8/2008 | Bakewell | G06Q 30/02 705/14.19 |
| 2008/0215413 A1* | 9/2008 | Barnard | G06Q 10/063 705/7.15 |
| 2008/0306755 A1* | 12/2008 | Barnard | G06Q 10/063 705/1.1 |
| 2009/0023475 A1* | 1/2009 | Chang | H04M 1/72527 455/557 |
| 2010/0188226 A1* | 7/2010 | Seder | G08B 21/0275 340/572.1 |
| 2011/0004513 A1* | 1/2011 | Hoffberg | G06Q 30/0207 705/14.1 |
| 2011/0184802 A1* | 7/2011 | Ieong | G06Q 30/0246 705/14.45 |
| 2013/0073387 A1* | 3/2013 | Heath | G06Q 30/02 705/14.53 |
| 2013/0073389 A1* | 3/2013 | Heath | G06Q 30/02 705/14.54 |
| 2013/0073400 A1* | 3/2013 | Heath | G06Q 30/02 705/14.73 |
| 2013/0073473 A1* | 3/2013 | Heath | G06Q 30/02 705/319 |
| 2014/0120829 A1* | 5/2014 | Bhamidipati | H04N 21/42207 455/3.06 |
| 2014/0165159 A1* | 6/2014 | Baade | H04L 63/08 726/4 |
| 2015/0019266 A1* | 1/2015 | Stempora | G06Q 40/08 705/4 |
| 2015/0025917 A1* | 1/2015 | Stempora | G06Q 40/08 705/4 |
| 2015/0141067 A1* | 5/2015 | Chien | H04W 8/186 455/519 |
| 2015/0170427 A1* | 6/2015 | Hansen | G07C 5/008 701/31.5 |
| 2015/0208457 A1* | 7/2015 | Thanayankizil | H04W 76/15 370/329 |
| 2015/0242696 A1* | 8/2015 | Kim | G06F 3/0416 345/173 |
| 2015/0264123 A1* | 9/2015 | Smadi | H04W 4/12 709/206 |
| 2015/0271201 A1* | 9/2015 | Ruvio | H04L 63/1408 726/23 |
| 2016/0050114 A1* | 2/2016 | John Archibald | G06F 1/3206 370/254 |
| 2016/0127950 A1* | 5/2016 | Gupta | H04W 48/16 370/255 |
| 2016/0192346 A1* | 6/2016 | Chien | H04W 8/186 370/329 |
| 2016/0232627 A1* | 8/2016 | Smith | G06Q 50/14 |
| 2016/0249158 A1* | 8/2016 | Tredoux | H04W 4/008 |
| 2016/0330676 A1* | 11/2016 | Thangarasa | H04W 76/14 |
| 2016/0373501 A1* | 12/2016 | Celinski | G06F 3/162 |
| 2016/0373899 A1* | 12/2016 | Celinski | G06F 3/162 |
| 2016/0381505 A1* | 12/2016 | Sankaran | H04W 4/21 455/418 |
| 2017/0104824 A1* | 4/2017 | Bajwa | H04W 4/025 |
| 2017/0105102 A1* | 4/2017 | Smadi | H04W 4/08 |
| 2017/0142023 A1* | 5/2017 | Yadav | H04L 47/70 |
| 2017/0146801 A1* | 5/2017 | Stempora | G02B 27/0172 |
| 2017/0147990 A1* | 5/2017 | Franke | G06Q 10/20 |
| 2017/0147991 A1* | 5/2017 | Franke | G06Q 10/20 |
| 2017/0148101 A1* | 5/2017 | Franke | G06Q 10/20 |
| 2017/0148102 A1* | 5/2017 | Franke | G06Q 10/20 |
| 2017/0149950 A1* | 5/2017 | Wakita | H04B 1/3822 |
| 2017/0150377 A1* | 5/2017 | John Archibald | H04W 24/02 |
| 2017/0180547 A1* | 6/2017 | Magahern | H04M 1/72597 |
| 2017/0182985 A1* | 6/2017 | Dai | H04W 4/70 |
| 2017/0235848 A1* | 8/2017 | Van Dusen | G06F 17/30979 705/12 |
| 2017/0264641 A1* | 9/2017 | Wood | H04L 63/20 |
| 2018/0075717 A1* | 3/2018 | Reinbold | G08B 7/00 |

* cited by examiner

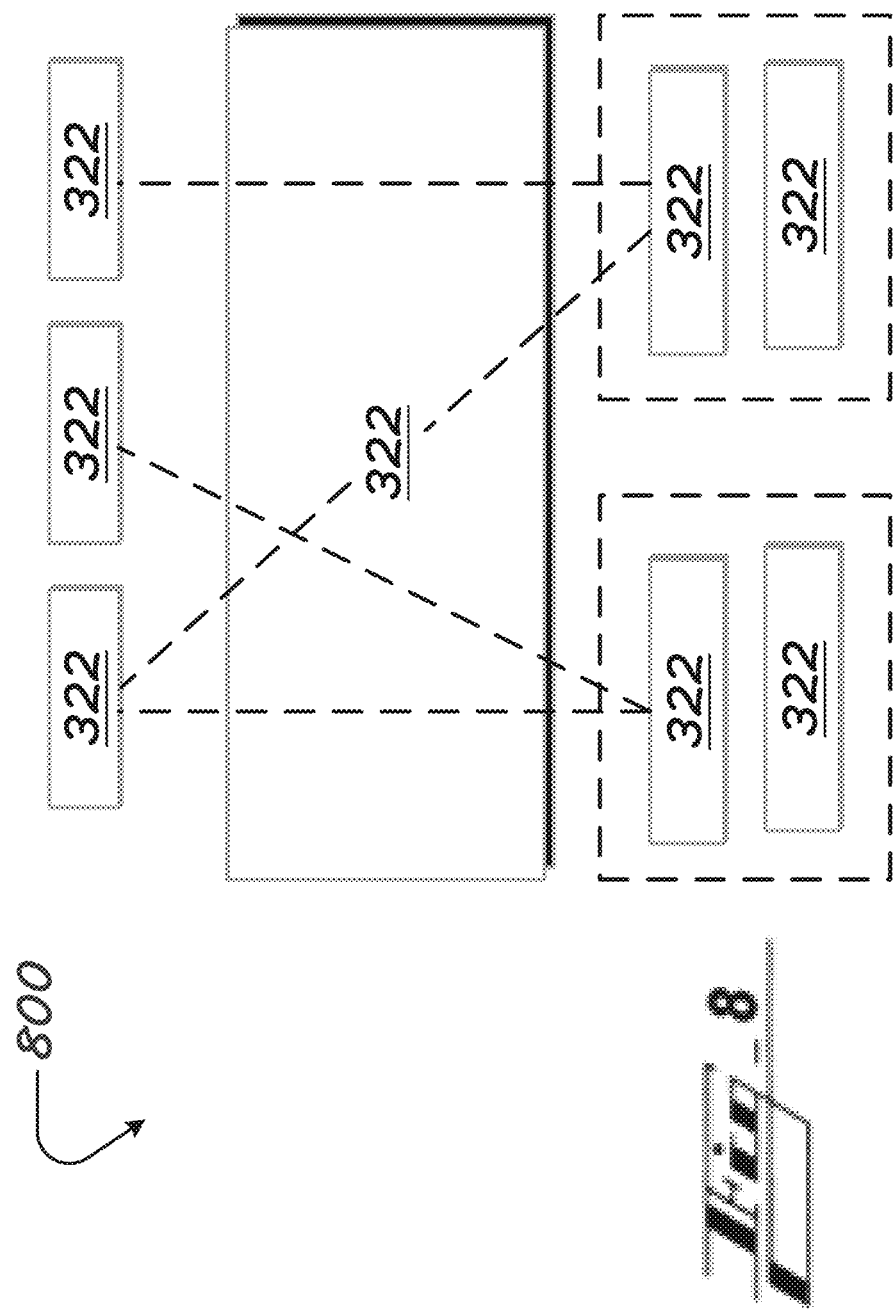

WIRELESS-ENABLED CONSUMER PORT APPARATUS FOR ACCOMMODATING AFTER-MARKET DEVICES FLEXIBLY IN VEHICLES

TECHNICAL FIELD

The present disclosure relates generally to vehicle-based infotainment systems and, more particularly, to wireless-enabled consumer port apparatus for flexibly accommodating after-market devices at the vehicle.

BACKGROUND

This section provides background information related to the present disclosure which is not necessarily prior art.

Modern vehicles have increasingly complex infotainment systems. With each new model year comes additional functionalities.

For providing existing vehicle users with access via the vehicle to select functions or applications of a smartphone that are not built into the vehicle, smartphone projection standards have been developed. The standards allow mobile communication devices to be operated by a user via a dashboard head unit of the vehicle. Example smartphone applications that can be accessed via the head unit, and can have output provided by way of the head unit, include mapping/navigation, music playback, texting, telephony, and web-search apps.

Numerous challenges remain as many applications of mobile devices are not accessible by way of vehicles, or cannot be seamlessly supported, via any projection standard or otherwise.

More applications could be accessed by way of existing vehicle systems, but only with substantial hardware and software updates at the vehicle to change connectivity options, and so is not done due to the prohibitive time and cost requirements.

SUMMARY

In one aspect, the present technology relates to a vehicle system including a non-transitory computer-readable storage device having a device-discovery module that, when executed by a hardware-based processing unit, determines, using a vehicle communication hardware component, presence of one or more proximate devices that are not native to the subject vehicle. The storage component also includes a service-discovery module that, when executed by the hardware-based processing unit, determines needs of various devices, or resources of the devices, including (i) any of the proximate devices, (ii) a primary vehicle communication interface, (iii) a vehicle consumer-port interface, and (iv) one or more embedded vehicle components.

The storage component also includes a resource-discovery module that, when executed, determines one or more resources of the various devices available to serve the needs determined The storage component further includes a grouping module that, when executed, establishes one or more groups amongst the various devices, yielding grouped devices of the various devices.

In various embodiments, the storage component also includes a role-assignment module that, when executed, assigns roles to grouped devices for meeting determined needs using resources determined.

In some implementations, the storage component also includes the vehicle system, wherein the non-transitory computer-readable storage device comprises a maintenance module that, when executed, maintains operations at and/or interactions amongst the grouped devices.

In various embodiments, the storage component also includes a soft-state-refresh module that, when executed, performs a soft-state refresh operation in connection with the groups established.

In various embodiments, the storage component also includes a group-release module that, when executed, releases the groups in response to the needs, for which the groups were established, being met.

In some implementations, the grouped devices include at least two bidding devices having need for a sought resource of the resources, and the non-transitory computer-readable storage device comprises a broker module that, when executed, determines which of the grouped devices will have access to the sought resource.

The broker module, upon determining which of the bidding devices will have access to the sought resource, initiates delivery of a notification to each of the bidding devices advising whether the bidding device is being awarded access to the sought resource.

The broker module, upon determining which of the bidding devices will have access to the sought resource, initiates delivering, to a resource device to provide the resource, of the grouped devices, a resource notification referencing the bidding device awarded access to the sought resource.

The broker module, in determining which of the bidding devices will have access to the sought resource, uses an auction-and-bid protocol.

The auction-and-bid protocol comprises a utility function configured to determine which of the grouped devices is best to receive access to the sought resource.

The hardware-based processing unit, in connection with the auction-and-bid protocol, receives a bid from each of the bidding devices.

Various aspects of the present technology include non-transitory computer-readable storage devices, processing units, and algorithms configured to perform any of the operations described.

Other aspects of the present technology will be in part apparent and in part pointed out hereinafter.

DESCRIPTION OF THE DRAWINGS

FIG. 8 illustrates operation of a multi-user hardware abstraction layer according to embodiments of the present technology.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, wireless-enabled consumer port apparatus for flexibly accommodating after-market devices flexibly at the vehicle.

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, busses, trolleys, trains, commercial or manufacturing equipment (for example, forklift), construction machines, and agricultural machinery, warehouse equipment, the like, and other.

II. Host Vehicle—FIG. 1

Figure 1:
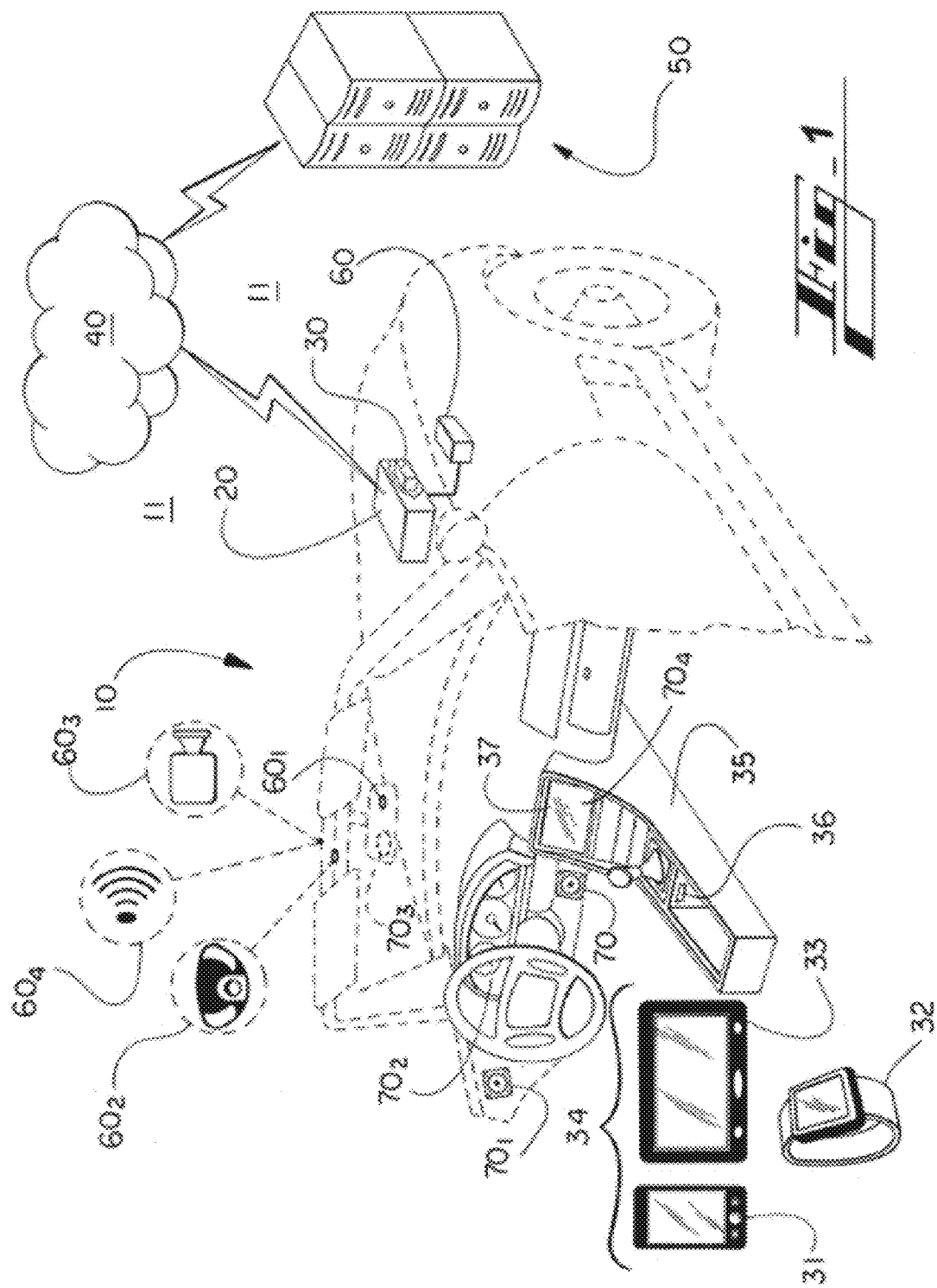
FIG. 1 illustrates schematically an example vehicle of transportation, with local and remote computing devices, according to embodiments of the present technology.

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communication sub-system 30 for communicating with mobile or local computing devices 34 and external networks 40, such as via a center console module or head unit system, which can be considered indicated generally by references numeral 37, also pointing directly to a visual display of the center console.

By the external networks 40, such as the Internet, a local-area, cellular, or satellite network, vehicle-to-vehicle, pedestrian-to-vehicle, road-side infrastructure networks, the like or other, the vehicle 10 can reach mobile or local systems 34 or remote systems 50, such as remote servers.

Example mobile or local devices 34 include a user smartphone 31, an example user wearable device 32 in the form of a smart watch, and a user tablet 33.

In various embodiments, mobile or local devices 34 include add-on peripherals, such as a Wi-Fi-enabled gesture-sensing (or, gesture-control) device, camera, or printer.

Example wearables 32, 33 other than the smart watch shown include smart apparel, such as a shirt or belt, an accessory such as arm strap, or smart jewelry, such as earrings, necklaces, and lanyards.

Another example mobile or local device is a user plug-in device, such as a USB mass storage device, or such a device configured to communicate wirelessly.

Still another example mobile or local device is an on-board device (OBD) (not shown in detail), such as a wheel sensor, a brake sensor, an accelerometer, a rotor-wear sensor, a throttle-position sensor, a steering-angle sensor, a revolutions-per-minute (RPM) indicator, a brake-torque sensors, other vehicle state or dynamics-related sensor for the vehicle, with which the vehicle is retrofitted with after manufacture. The OBD(s) can include or be a part of the sensor sub-system referenced below by numeral 60.

The vehicle controller system 20, which in contemplated embodiments includes one or more microcontrollers, can communicate with OBDs via a controller area network (CAN) and/or Ethernet. The CAN/Ethernet message-based protocol is typically designed for multiplex electrical wiring with automobiles, and CAN/ETHERNET infrastructure may include a CAN/ETHERNET bus. The OBD can also be referred to as vehicle CAN/ETHERNET interface (VCI, VEI, etc.) components or products, and the signals transferred by the CAN/ETHERNET may be referred to as CAN/ETHERNET signals. Communications between the OBD(s) and the primary controller or microcontroller 20 are in other embodiments executed via similar or other message-based protocol.

The vehicle 10 also has various mounting structures 35. The mounting structures 35 include a steering wheel, a central console, and a dashboard or instrument panel. The mounting structures 35 also include or host a plug-in port 36—a USB port, for instance—and a visual display 37, such as a touch-sensitive, input/output, human-machine interface (HMI).

The vehicle 10 also has a sensor sub-system 60 including sensors providing information to the controller 20. Sensor input to the controller 20 is shown schematically at the right, under the vehicle hood, of FIG. 1. Example sensors having base numeral 60 ($60_1$, $60_2$, etc.) are also shown.

Sensor data relates to features such as vehicle operations, vehicle position, and vehicle pose, user characteristics, such as biometrics or physiological measures, and environmental-characteristics pertaining to a vehicle interior or outside of the vehicle 10.

Example sensors include a camera $60_1$ positioned in a rear-view mirror of the vehicle 10, a dome or ceiling camera $60_2$ positioned in a header of the vehicle 10, a world-facing camera $60_3$ (facing away from vehicle 10), and a world-facing range sensor $60_4$. Intra-vehicle-focused sensors $60_1$, $60_2$, such as cameras, and microphones, are configured to sense presence of people, activities or people, or other cabin activity or characteristics. The sensors can also be used for authentication purposes, in a registration or re-registration routine. This subset of sensors are described more below.

World-facing sensors $60_3$, $60_4$ sense characteristics about an environment 11 comprising, for instance, billboards, buildings, other vehicles, traffic signs, traffic lights, road conditions, obstacles, pedestrians, etc.

The OBDs mentioned can be considered as local devices, sensors of the sub-system 60, or both in various embodiments.

Mobile or local devices 34 can be considered as sensors 60 as well, such as in embodiments in which the vehicle 10 uses data provided by the local device based on output of a local-device sensor(s). The vehicle system can use data from a user smartphone, for instance, indicating user-physiological data sensed by a biometric sensor of the phone.

The vehicle 10 also includes cabin output components 70, such as audio speakers $70_1$, and an instruments panel or display $70_2$. The output components may also include a dash or center-stack display screen $70_4$, a rear-view-mirror screen $70_3$ (for displaying imaging from a vehicle all/backup camera), and any vehicle visual display device 37.

III. On-Board Computing Architecture—FIG. 2

Figure 2:
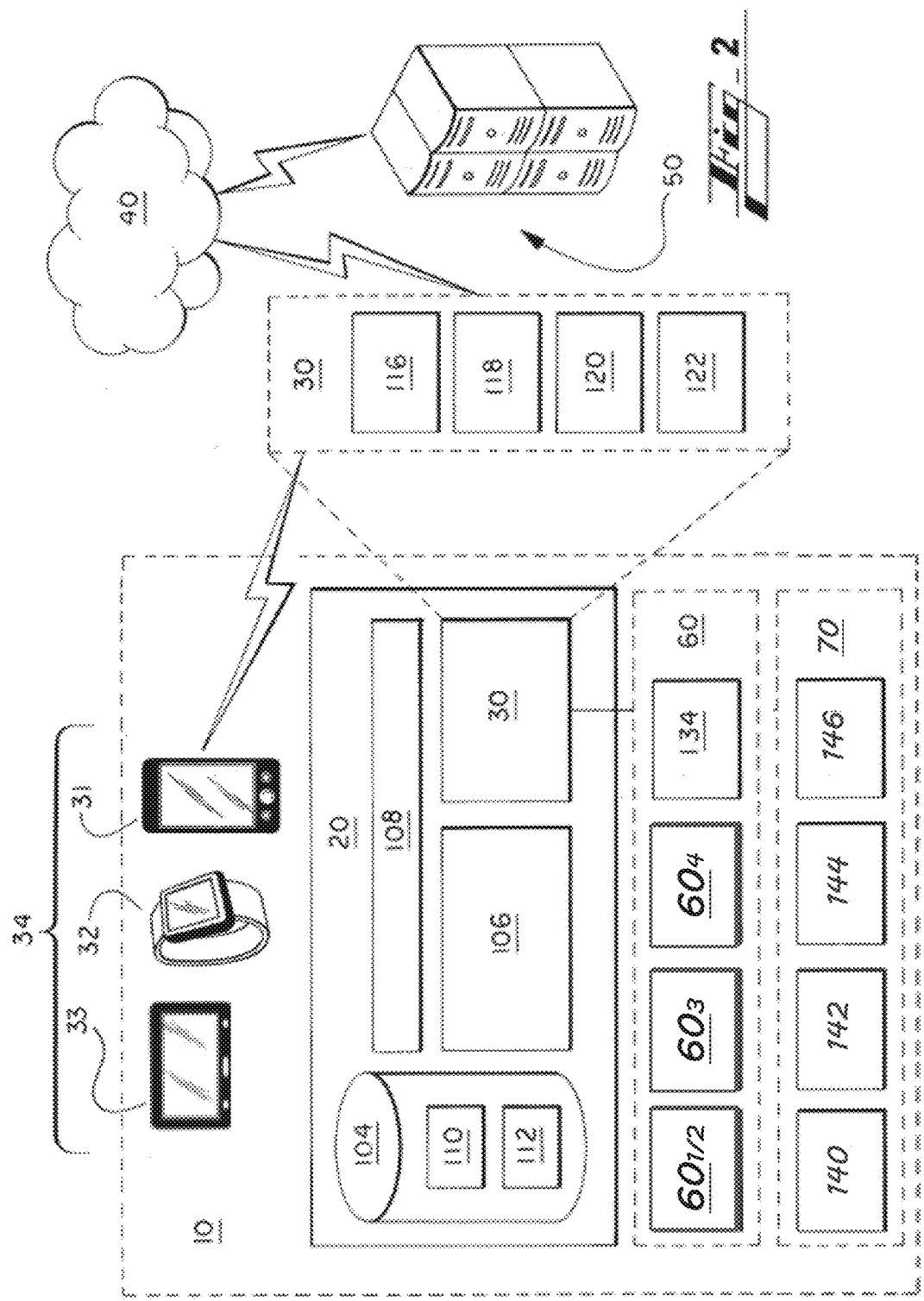
FIG. 2 illustrates schematically more details of the example vehicle computer of FIG. 1 in communication with the local and remote computing devices. The structure shown also exemplifies computing structure that any of the systems described herein—mobile, local, peripheral, or remote—can have.

FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is, in various embodiments, part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 can include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 comprises one or more of a volatile medium, a non-volatile medium, a removable medium, and/or a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules storing computer-readable code or instructions executable by the processing unit 106 to perform the functions of the controller system 20 described herein. The modules and functions are described further below in connection with FIGS. 3-8.

The data storage device 104 in various embodiments also includes ancillary or supporting components, such as additional software and/or data supporting performance of the processes of the present disclosure, such as one or more user profiles or a group of default and/or user-set preferences.

One or more components of the controller system 20 can be duplicated, working separately from the others or in concert. A vehicle 10 may include multiple on-board controllers, such as one controlling or otherwise working with a central-stack module (CSM) interface (typically for wireless communications) and one controlling or working with a consumer port (CP) interface (again, wired and/or wireless), such a port including the USB port 36. The CSM is not necessarily limited in location or function within the vehicle 10 by the term "central-stack." The CSM interface can be referred to by other terms such as a main or primary vehicle communication module interface, a vehicle communication module interface, a vehicle communication interface, the like or other, for instance.

The CSM and CP interfaces include modules that can be referred to by functions they perform. A CSM component associated with performing an auction-and-bid protocol, described more below, can be referred to as an auction-and-bid module, an auction module, a bid module, or the like. A CP component associated with performing a security function, screening connections between it and mobile or add-on peripheral devices, or data received from them, for instance, can be referred to as a security module, a screening module, or the like. The modules can be stored at one or more storage devices at the vehicle and executed by one or more processing units.

Modern vehicles of course include at least one engine control unit (ECU). Any of these various computing implementations, then, can have separate or shared components. The computing structure working with the CSM and the computing structure working with the CP can share a processor for instance, and have separate code, stored on the same storage device or separate storage device. Computing structure(s) can also have separate or share other structure intimate to or ancillary to the computing components, such as transceivers, antennas, or other system I/Os, such as display screens, microphones, many of which are described more below.

Moreover, each mobile, local, add-on, peripheral, or other computerized or electronic device or system, such as the mobile devices 34 and server 50, can have a similar structure, including any of the same or analogous components.

With respect to the computing systems of the vehicle 10, as the present technology involves coordinating communications between two or more wired and/or wireless interfaces, such as the CSM and the CP interfaces mentioned, contents of the storage device 104 is described by way of example primarily with reference to a CSM components 110 and CP components 112, therein. Again, while the components 110, 112 are shown together in a single storage device 104 by way of example in FIG. 2, the components 110, 112, or any parts thereof, can be kept at separate storage devices, and can be executed by the same processing unit or separate processing units.

As provided, the controller system 20 also includes a communication sub-system 30 for communicating with local and external devices and networks 34, 40, 50. The communication sub-system 30 in various embodiments includes any of a wire-based input/output (i/o) 116, at least one long-range wireless transceiver 118, and one or more short- and/or medium-range wireless transceivers 120. The component 122 is shown by way of example to emphasize that the system can be configured to accommodate one or more other types of wired or wireless communications.

The long-range transceiver 118 is in some embodiments configured to facilitate communications between the controller system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 20 can, by operation of the processor 106, send and receive information, such as in the form of messages or packetized data, to and from the communication network(s) 40.

Remote devices 50 with which the sub-system 30 communicates are in various embodiments nearby the vehicle 10, remote to the vehicle, or both.

The remote devices 50 can be configured with any suitable structure for performing the operations described herein. Example structure includes any or all structures like those described in connection with the vehicle computing device 20. A remote device 50 includes, for instance, a processing unit, a storage medium comprising modules, a communication bus, and an input/output communication structure. These features are considered shown for the remote device 50 by FIG. 1 and the cross-reference provided by this paragraph.

While local devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A user computing or electronic device 34, such as a smartphone, can also be remote to the vehicle 10, and in communication with the sub-system 30, such as by way of the Internet or other communication network 40.

An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 comprising sensors providing information to the controller system 20 regarding items such as vehicle operations, vehicle position, vehicle pose, user characteristics, such as biometrics or physiological measures, and/or the environment about the vehicle 10. The arrangement can be configured so that the controller system 20 communicates with, or at least receives signals from sensors of the sensor sub-system 60, via wired or short-range wireless communication links 116, 120.

In various embodiments, the sensor sub-system 60 includes at least one camera and at least one range sensor $60_4$, such as radar or sonar, directed away from the vehicle, such as for supporting autonomous driving. In some embodiments a camera is used to sense range.

Visual-light cameras $60_3$ directed away from the vehicle 10 may include a monocular forward-looking camera, such as those used in lane-departure-warning (LDW) systems. Embodiments may include other camera technologies, such as a stereo camera or a trifocal camera.

Sensors configured to sense external conditions may be arranged or oriented in any of a variety of directions without departing from the scope of the present disclosure. For example, the cameras $60_3$ and the range sensor $60_4$ may be oriented at each position, or a select position, of (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor $60_4$ may include a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include the mentioned cabin sensors ($60_1$, $60_2$, etc.) configured and arranged (for instance, positioned and fitted in the vehicle) to sense activity, people, cabin environmental conditions, or other features relating to the interior of the vehicle. Example cabin sensors ($60_1$, $60_2$, etc.) include microphones, in-vehicle visual-light cameras, seat-weight sensors, user salinity, retina or other user characteristics, biometrics, or physiological measures, and/or the environment about the vehicle 10.

The cabin sensors ($60_1$, $60_2$, etc.), of the vehicle sensors 60, may include one or more temperature-sensitive cameras (for instance, visual-light-based (3D, RGB, RGB-D), infra-red or thermographic) or sensors. In various embodiments, cameras are positioned preferably at a high position in the vehicle 10. Example positions include on a rear-view mirror and in a ceiling compartment.

A higher positioning reduces interference from lateral obstacles, such as front-row seat backs blocking second- or third-row passengers, or blocking more of those passengers. A higher positioned camera (light-based (for instance, RGB, RGB-D, 3D, or thermal or infra-red) or other sensor will likely be able to sense temperature of more of each passenger's body—for example, torso, legs, feet.

Two example locations for the camera(s) are indicated in FIG. 1 by reference numeral $60_1$, $60_2$, etc.—on at rear-view mirror and one at the vehicle header.

Other example sensor sub-systems 60 include dynamic vehicle sensors 134, such as an inertial-momentum unit (IMU), having one or more accelerometers, a wheel sensor, or a sensor associated with a steering system (for example, steering wheel) of the vehicle 10.

The sensors 60 can include any sensor for measuring a vehicle pose or other dynamics, such as position, speed, acceleration, or height—for instance, vehicle height sensor.

The sensors 60 can include any known sensor for measuring an environment of the vehicle, including those mentioned above, and others such as a precipitation sensor for detecting whether and how much it is raining or snowing, a temperature sensor, and any other.

Sensors for sensing user characteristics include any biometric or physiological sensor, such as a camera used for retina or other eye-feature recognition, facial recognition, or fingerprint recognition, a thermal sensor, a microphone used for voice or other user recognition, other types of user-identifying camera-based systems, a weight sensor, breath-quality sensors (for instance, breathalyzer), a user-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), and user-temperature, a sensor measuring salinity level, the like, or other.

User-vehicle interfaces, such as a touch-sensitive display 37, buttons, knobs, the like, or other can also be considered part of the sensor sub-system 60.

FIG. 2 also shows the cabin output components 70 mentioned above. The output components in various embodiments include a mechanism for communicating with vehicle occupants. The components include but are not limited to audio speakers 140, visual displays 142, such as the instruments panel, center-stack display screen, and rear-view-mirror screen, and haptic outputs 144, such as steering wheel or seat vibration actuators. The fourth element 146 in this section 70 is provided to emphasize that the vehicle can include any of a wide variety of other in output components, such as components providing an aroma or light into the cabin.

IV. Vehicle System Architecture—FIG. 3

Figure 3:
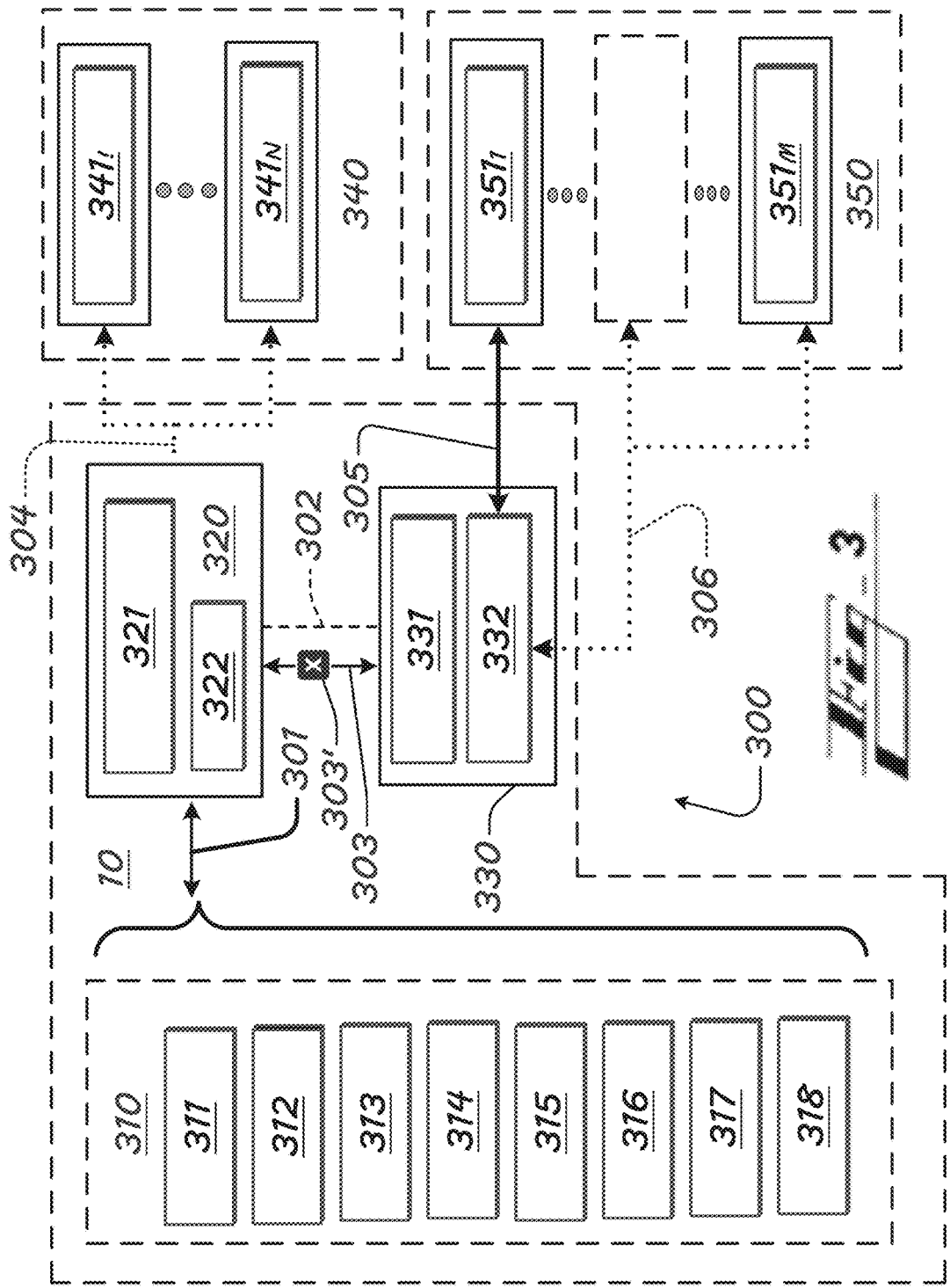
FIG. 3 illustrates a system architecture, mainly from a hardware perspective, according to embodiments of present technology.

FIG. 3 illustrates a system architecture 300, mainly from a hardware perspective for the vehicle 10, according to embodiments of present technology.

The system architecture 300 includes vehicle embedded peripherals 310, of the vehicle 10, a center stack module (CSM) interface 320 of the vehicle 10, a consumer port (CP) interface 330 of the vehicle 10, mobile devices 340, such as smart phones pre-configured for authorized communication with the CSM interface 320, and add-on devices or peripherals 350. Example add-on peripherals 350 include wireless or wired mobile or user devices, such as a mobile printer, a motion-detection or motion-control device, wireless earphones, the like or other. In most implementations, the peripherals 350 are after-market devices, not installed at the vehicle 10 by the original equipment manufacturer (OEM). Peripherals original to the vehicle are typically considered embedded 310.

Example vehicle embedded peripherals 310 include a display screen 311, a microphone 312, a speaker 313, a vehicle hard button 314 (switch, button, knob, etc.), a vehicle soft button 315 (selectable screen icon, slide, etc.), a vehicle communication pipe 316 (long or medium range communication component, such as for cellular, satellite, short or medium range, communications or other), a global positioning or navigation component 317, vehicle sensor 318, such as the sensor 60 mentioned above.

The center stack module (CSM) interface 320, or main or head unit communication interface, of the vehicle 10 is connected to the vehicle embedded peripherals 310 typically by a wired connection 301, such as an Ethernet connection.

In various embodiments, the CSM interface 320 includes at least one wireless docking station 321, such as a WiFi and/or a Bluetooth docking station.

The CSM interface 320 also includes a server 322, typically a wireless server, such as a wireless USB (WSB) server.

The consumer port (CP) interface 330 of the vehicle 10 is connected to the CSM interface 320 by wireless structure—e.g., transceivers—and selective wireless communications 302 using the same.

The two interfaces 330, 320 may be connected by wired connection 303. In most implementations, though, a wired connection 303 is not present, or not used some or all of the time, as indicated by the X 303' drawn on the line 303. Benefits of configuring the system without the wire(s) 303 here include material, installation-work, and so cost, savings. Benefits also include space saving in the vehicle.

Still another benefit of using only wireless communications between the CSM and CP interfaces 320, 330 include increased control and security of communications between the two interfaces 320, 330.

The consumer port (CP) interface 330 of the vehicle 10, in various embodiments, includes a wireless client 331, such as a WSB client corresponding to the WSB server 322 of the CSM interface 320.

There are various benefits to executing wireless communications by respective transceivers, other hardware, and/or software of, or controlling, one or both interfaces 320, 330. It can be easier to analyze, monitor, control, limit and/or take other appropriate actions (e.g., isolating the CP interface 330 from the CSM interface 320) regarding communications between the two interfaces 320, 330. In this way, inappropriate or unauthorized communications and operations, can be limited and restricted. The functions, such as scanning connections and analyzing incoming meta-data of these communication, can be performed generally continuously, intermittently at any suitable interval, or in response to a triggering event. An example triggering event includes determining attempted transmission of data of a certain type. Certain types may include, for instance, data having pre-identified characteristics, data apparently comprising malware or virus, or other suitable triggers determined appropriate by a system designer to protect one or more vehicle systems.

The CP interface 330 also includes a USB/WSB server, for serving needs of the add-on peripherals 350 when the peripherals 350 and are communicating with the CP interface 340.

The vehicle systems, such as the CSM interface 320, are configured to allow select mobile devices 340 to communicate with the vehicle 10 via a communication channel 304, typically wireless. The CSM interface 320 can communicate with any number (N) of mobile devices $341_1 \ldots 341_N$.

In various embodiments, the select mobile devices 340 are devices pre-configured for authorized communication with the CSM interface 320, such as most smart phones. The authorized nature can include the device being configured according to an industry standard for the purpose. The vehicle 10—e.g., CSM interface 320 or controlling structure—is configured in a corresponding manner, to allow the interface 320 or structure to confirm authenticity or proper configuration of the mobile devices 340 attempting to communicate with the vehicle 10 by the channel 304. In this way, the vehicle systems—CSM 320 and embedded peripherals 310, for instance—are protected well from receiving communications which are not qualified as authorized accessory via the connection 304.

The add-on peripherals 350 are typically after-market devices that a user seeks to use with the vehicle 10. The CSM interface 320 can communicate with any number (M) of add-on peripherals 351$_1$ ... 351$_M$, buy wire 305 or wireless channel 306.

The add-on peripherals 350 can be mobile, such as readily taken from vehicle to vehicle, to office, to home, etc., or can be connected to the vehicle. An example add-on peripheral 350 is a printer, for instance, such as a paper printer or a 3D printer, printing with thermoplastic ink, the like, or other. In this example, the printer can be kept mobile, or mounted releasably (e.g., hook-and-loop, releasable mounting apparatus) or more permanently (e.g., bolt, adhesive).

Other example peripherals 350 include wireless or wired mobile or user devices, such as a motion-detection or motion-control device, wireless earphones, the like or other. In most implementations, the peripherals 350 are after-market devices, not installed at the vehicle 10 by the original equipment manufacturer (OEM). Peripherals original to the vehicle are typically embedded devices 310.

V. Vehicle Network System and Processes for Selectively Formulating Groups—FIGS. 4 AND 5

Figure 4:
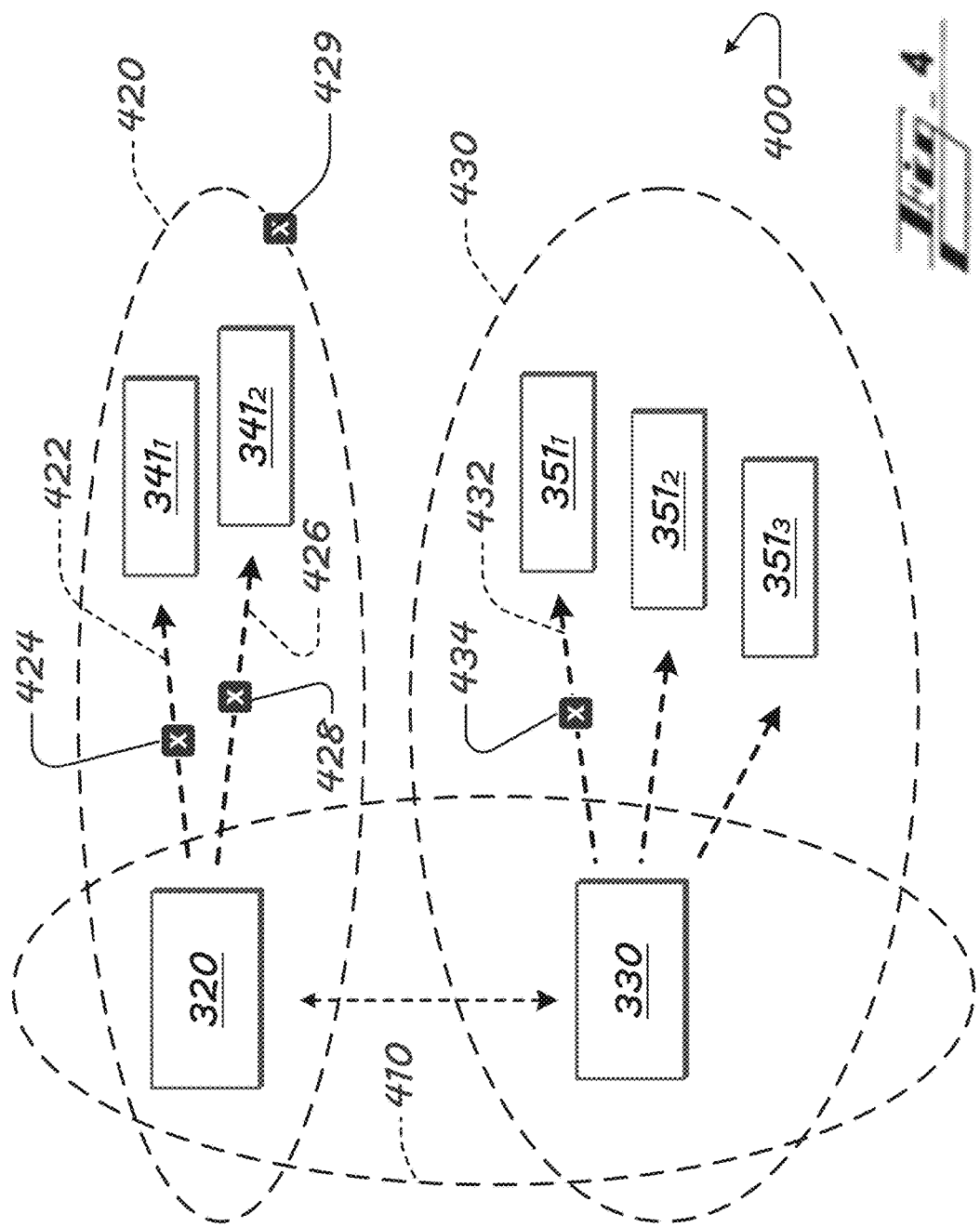
FIG. 4 illustrates example network system operations according to embodiments of the present technology.

FIG. 4 illustrates example network system operations 400 according to embodiments of the present technology. FIG. 4 is described with FIG. 5, which illustrates functions 500 for formulating and breaking apart groups using components of the network system operations of FIG. 4, according to embodiments of the present technology.

Though a single process 500 is shown for simplicity, any of the functions or operations can be performed in one or more processes, routines, or sub-routines of one or more algorithms, by one or more devices or systems.

It should be understood that steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

As shown in FIG. 4, the operations involve the CSM interface 320 and the CP interface 330, of FIG. 3.

Figure 5:
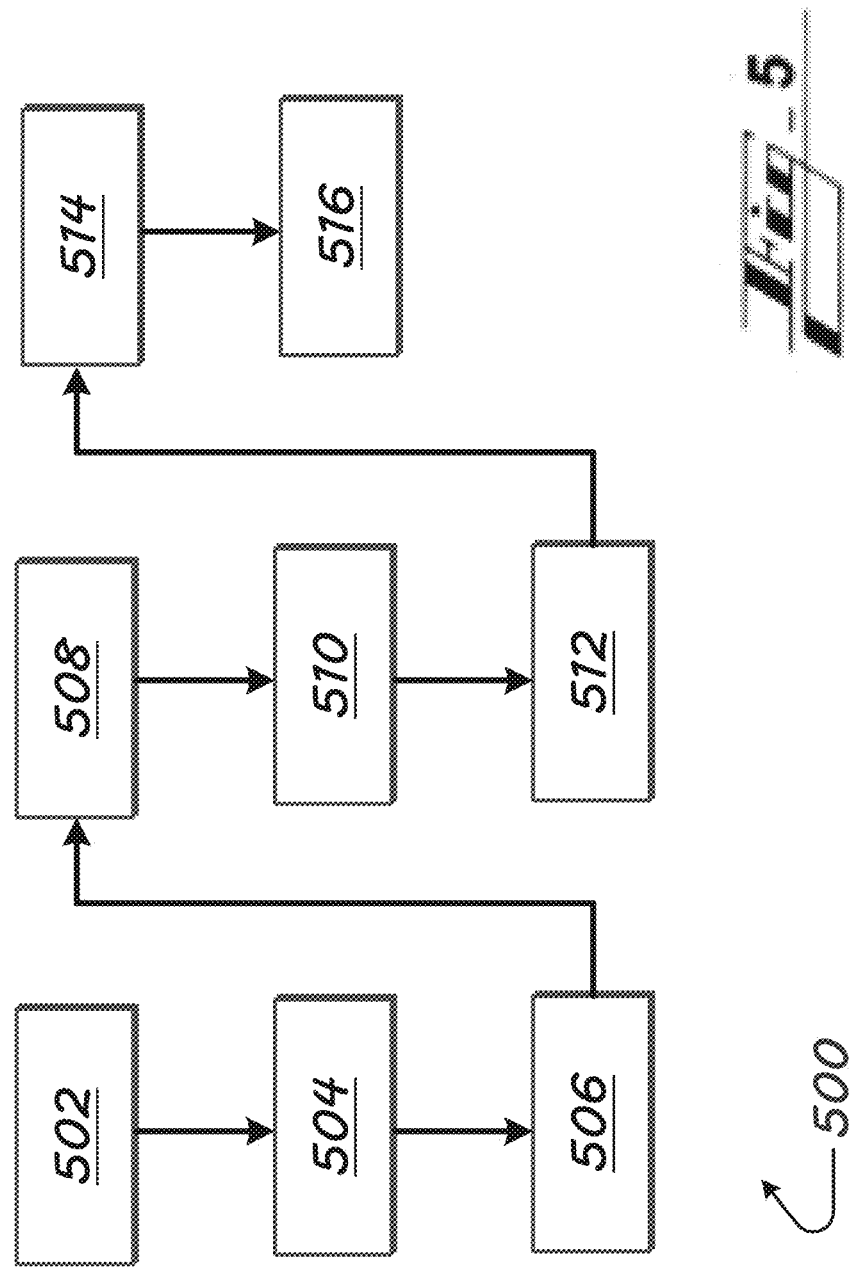
FIG. 5 illustrates functions for formulating and breaking apart groups using components of the network system operations of FIG. 4, according to embodiments of the present technology.

Turning to FIG. 5, at block 502 one or both interfaces 320, 330 perform a device discovery function. In various embodiments, the interfaces 320, 330 by this function 502 send or broadcast signals or messages seeking reply from any non-vehicle devices 340, 350 that the user may want in communication with the vehicle 10. The term non-vehicle devices in various embodiments refers to devices that are not of a subject vehicle. For instance, another, proximate vehicle, communicating with the subject vehicle, can be a non-vehicle device because it is not part of or native to the subject device. The term can thus also be provided as non-subject-vehicle devices. The signals can include an identifier for the respective interface 320, 330. In response, non-vehicle devices 340, 350 can respond with a reply signal or message indicating that the non-vehicle device is present. The reply signal can also include an identifier, particular to the responding non-vehicle device.

At the second operation 504 of FIG. 5, the CSM and CP interfaces 320 330 perform service discovery. These functions in various embodiments include the interfaces 320, 330 determining, evaluating, or assessing needs, such as needs that the non-vehicle device(s) 340, 350 communicated with have and/or needs that the vehicle 10, such as of the CSM interface 320, the CP interface 330, or embedded vehicle devices 310. Any of these devices can have needs that can be satisfied by any of the other devices.

A non-vehicle device may need, or desire to use, for example, access to a communication channel of the vehicle 10 to reach the internet or a remote server—e.g., music app server. And/or the vehicle 10—e.g., embedded device(s) 310—may be seeking to use a non-vehicle device to use output of a non-vehicle device sensor, such as a altimeter or barometer, which the vehicle 10 does not have natively, and which output can be used to support autonomous or other driving, navigation functions.

In some embodiments, these functions 504 include determining what resources—e.g., of the CSM interface 320, of the CP interface 330, and/or of one or more of the non-vehicle devices 340, 350—will meet, or are available for possibly meeting, the needs determined. In various embodiments, this function is performed in the next operation 506.

At the third operation 506, the vehicle 10, for instance, the CSM interface 320, formulates one or more groups.

In creating the group(s) 506, if not already done, the CSM interface 320 and CP interface 330 can be established as a group, as indicated in FIG. 4 by reference numeral 410. In various embodiments, this is a permanent group at the vehicle 10. The establishment can be performed at the CSM interface 320; and the relationship 410 established in code at or associated with the CSM interface 320. By the establishment, the CSM and CP interfaces 320, 330 can readily share information as needed to satisfy their needs, other needs of the vehicle (e.g., of the embedded devices 310), or of the non-vehicle devices 340, 350.

At block 508, roles are in various embodiments assigned for the CSM and CP interfaces 320, 330 with respect to the various non-vehicle devices 341, 351. In implementations, assignments indicate relationships amongst any of the CSM, the CP, the non-vehicle devices, and embedded vehicle devices.

In the example of FIG. 5, the assignments are within, or create further, groups 420, 430, incorporating the non-vehicle devices. These groups 420, 430 can be referred to as ad-hoc, or temporary, groups, for use in satisfying the determined need(s), using the determined resource(s).

The assignments in various embodiments thus match up the needs amongst the relevant computing devices—e.g., embedded peripherals 310, CSM 320, CP 330, authorized mobile devices 340, add-on peripherals 350, and other non-vehicle systems, such as a remote server, road-side infrastructure, other vehicles, etc., in communication with one of these 310, 320, 330, 340, 350. Any of these devices can have the need for service, identified at operation 504, that can be met by another of the devices.

Generally, the role for the CSM 320 and authorized mobile devices 341 includes their communicating directly with each other, as shown by the second group 420 of FIG. 4. Though, the services rendered to either 341, 320 need not be delivered directly from the other. An authorized mobile device may have a need to be satisfied by an embedded peripheral 310, for instance, and the CSM is a conduit by which the service is provided. Further in this example, a service could include user input requested by the mobile device 341, served using an embedded vehicle microphone 312.

In a contemplated embodiment, authorized mobile device(s) 341 can communicate directly with the CP interface 330, such as if it is determined that such direct communications have benefits, such as promoting faster communications or other operations at the vehicle 10 (e.g., at either of, or between, the CSM and CP 320, 330), promotes faster communications or other operations at the mobile device(s) 341, use of less bandwidth at any of the interfaces or non-vehicle devices 351, the like, or other.

Generally, the role for the CP interface 330 and add-on peripheral devices 351 includes their communicating directly with each other, as shown by the third group 430 of FIG. 4. Though, again, the CP interface 330 may be a conduit through which a need of an add-on peripheral device 351 is met or through which a need of another device, served by the add-on peripheral device 351, is met.

At block 510, the operations within the relationships created by the grouping and role assignments are maintained. The operations can be referred to as sessions between the various devices. In various embodiments, primary session maintenance functions are performed by the CSM interface 320. The maintenance can include establishing, monitoring, and/or facilitating or managing the inter-operations—e.g., data requests and delivery, etc.—amongst the involved devices.

At block 512, one or more soft-state refreshes may be performed amongst the relationships established, including but not limited to the groups 410, 420, 430 created and being maintained 510. In one embodiment, each node communicates periodically its status and/or any other important characteristic(s) pertaining to the node's current operations. The communication is sent to any relevant destination— entities or systems. The destination systems can renew or adjust operations accordingly, based on the updated operations information.

At block 514, as each need is satisfied, and the corresponding relationship no longer needed, the corresponding association or connection is released accordingly. As the first illustrated add-on peripheral device $451_1$ of FIG. 4 has received the service (e.g., data) needed, or provided all the service asked of it, then the connection 432 between it and the CP interface 330 is released, as indicated by the 'X' 434 on that line. The same concept are exemplified also by reference numerals 422 and 424, between the first mobile device $341_1$ and the CSM interface 320, and by numerals 426 and 428, between the second illustrated mobile device $341_N$ and the CSM interface 320, of the second group 420.

When all needs within a group 410, 420, 430 are satisfied, the group does not need to be maintained. Continuing with the example, once the needs serviced by, or the needs of, the first and second mobile devices $341_1$, $341_2$, are met, assuming they are the only two extra-vehicle devices in the group 420, the group can be removed, released, or demolished, as indicted by reference numeral 429 in FIG. 4.

VI. Vehicle Software Architecture—FIG. 6

Figure 6:
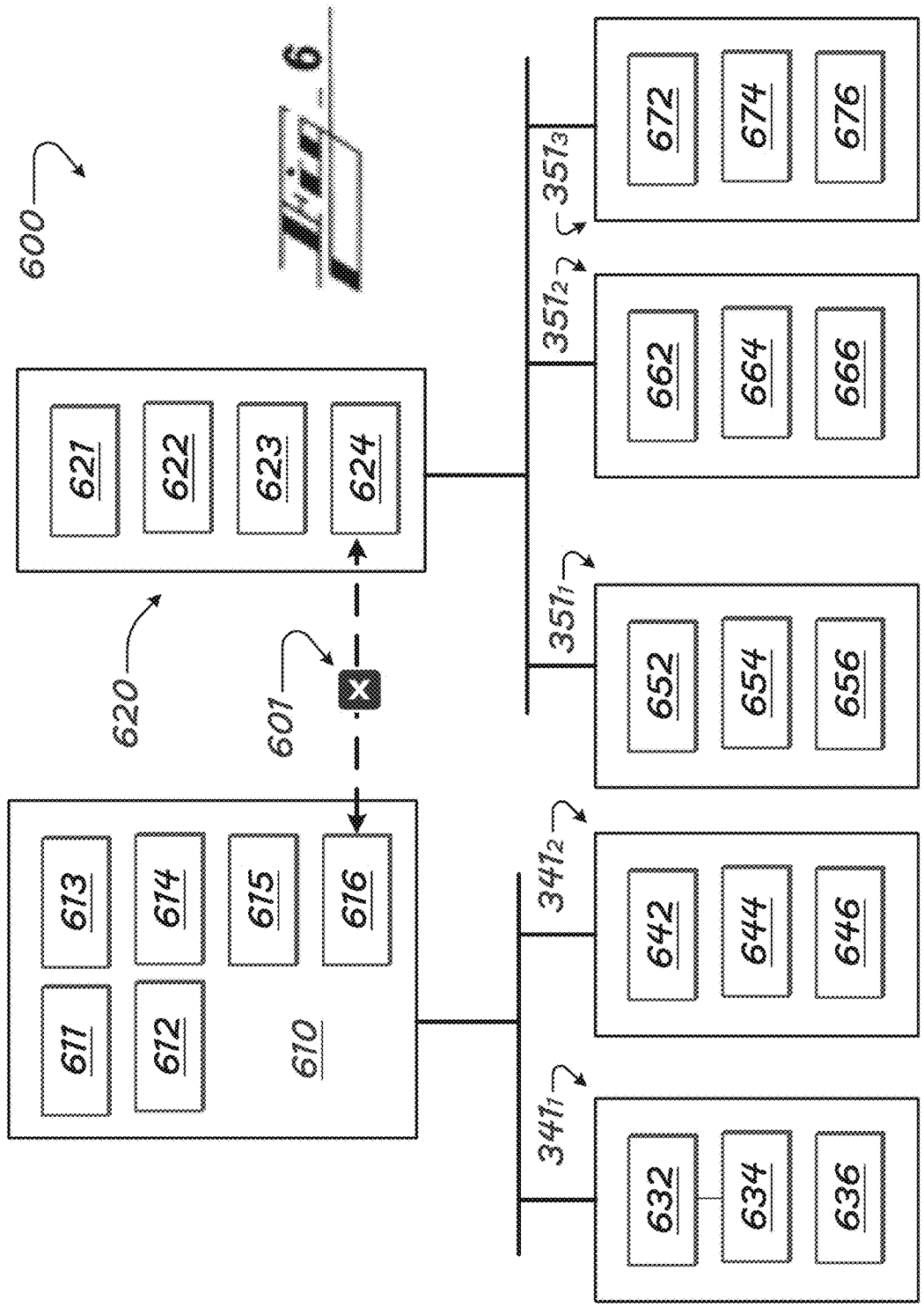
FIG. 6 illustrates a software architecture according to embodiments of the present technology.

FIG. 6 illustrates a software architecture 600 according to embodiments of the present technology.

The architecture 600 includes a first, CSM, component 610 having software, at a hardware storage device, for the CSM interface 320.

The architecture 600 includes a second, CP, component 620 having software, at a hardware storage device, for the CP interface 330.

Also as part of or connected to the architecture 600, is software, stored at respective hardware, of the authorized mobile device(s) $341_1$, $341_2$ and add-on peripheral device(s) $351_1$, $351_1$, $351_3$.

In various embodiments, the CSM component 610 includes:
  a resource management protocol 611;
  a bidding broker 612;
  user applications 613;
  a driver 614;
  a USB core 615; and
  a USB/WSB host 616.

The resource management protocol 611 is a protocol configured to manage connection of resources (e.g., of an embedded peripheral, add-on peripheral sensor, vehicle sensor, etc.) to needs (e.g., of a vehicle application, an embedded peripheral, a mobile device app, an add-on peripheral, a vehicle app, etc.). The functions can include any of the functions described above in connection with the second through eighth operations 504-516 of FIG. 5, for example.

The bidding broker 612 comprises software configured to determine optimal or preferred assignments between resources and needs. The functions can include any of the functions described above in connection with the group formulation and/or role identification operations 506, 508, for instance. Bidding functions are described further below in connection with FIG. 7.

The user applications 613 include applications native to the vehicle 10 or more specifically to the first, CSM, component 610. An example application is in various embodiments any of a variety of user-space apps.

The applications 613 may leverage the operation system of the CSM 610 and an underlying OS kernel device driver and/or any other middleware to operate the remote peripheral devices 34 seamlessly. As an example of seamless operation, the arrangement may operate as if the peripheral device 34 is physically attached to the CSM 610. The apps could use the remote printer device, remote camera, remote audio speaker, or any other remote devices via the extant wireless channels.

The driver 614 facilitates interactions between any of the various CSM hardware and software, including CSM apps, WSB/USB components, and an operating system the CSM with which the applications are executed.

The USB core 615 controls and manages operations involved with USB communications involving the CSM, including USB communications of by CP USB plug-in port serviced via the CP.

The USB/WSB host 616 interfaces with authorized mobile devices $341_{1-N}$, typically via WSB or other wireless standard and any wireless or wired (e.g., USB) communications via the CP component 620.

In various embodiments, the CP component 620 includes:
  user applications, such as a user space app 621, described above;
  a driver 622;
  a USB core 223; and
  a USB/WSB host 624.

The driver 622 of the CP component 620 facilitates interactions between any of the various CP hardware and software, including CP WSB/USB components (e.g., core, host), and an operating system the CP component 620.

The USB core 223 controls and manages operations involved with USB communications involving the CP, including USB communications of between the CP component 620 and add-on peripherals $351_{1-M}$, and between the CP and the CSM component 610.

The USB/WSB host 624 interfaces with the CSM component 410 and add-on peripherals, via WSB or other wireless standard, or wired (e.g., USB) communications.

Each non-vehicle device 341₁, 341₂, 351₁, 351₂, 351₄, includes:
- a communication client—e.g., WSB/USB client—632, 642, 652, 662, 672;
- a device driver—634, 644, 654, 664, 674; and
- a physical, hardware I/O device and/or the software for controlling same—636, 646, 656, 666, 676.

The WSB/USB facilitates communication with the respective host—CSM 220 or CP 230, using the I/O structure. The communication is typically by wireless communications in most implementations, but wired connection is possible, such as via a USB port of the CP 230. The device drivers facilitates interactions between device hardware and software including the WSB/USB client and an operating system with which applications are executed.

With further reference to FIG. 6, reference is made to the 'X' indicated by reference numeral 601, which indicates the optional communication isolation shown by the 'X' 303' in line 303 of FIG. 3. As described regarding that 'X' 303', the function isolation can be performed through proper mechanism, when necessary conditions are met. This set of necessary conditions and corresponding actions that are being performed could be decided by system designers based on the system design requirements.

VII. Distributed Auction-and-Bid Protocol Arrangement—FIG. 7

Figure 7:
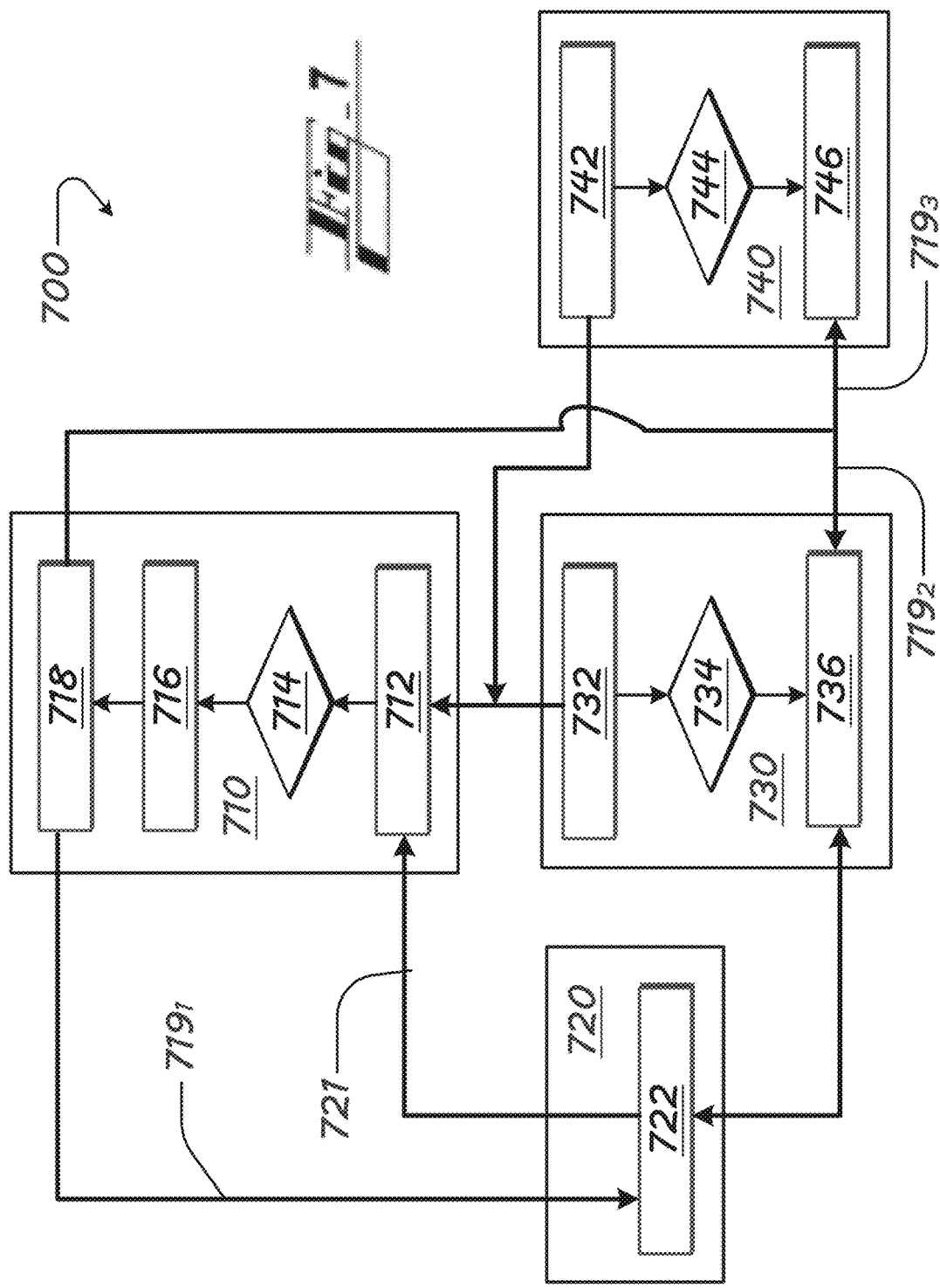
FIG. 7 illustrates functions of a distributed auction-and-bid protocol according to embodiments of the present technology.

FIG. 7 illustrates functions and components 700 associated with a distributed auction-and-bid protocol, according to embodiments of the present technology.

The protocol is embodied in computer-executable code stored at a vehicle storage medium. The code may be part of or stored with code of the CSM 320, and executed by the same processor performing CSM functions of FIG. 7.

The protocol 700 is in various embodiments configured to control assignment of one or more resources, or servers, to one or more clients, or customers. Particularly, the protocol 700 may be configured to control assignment of exclusive resources, which cannot be shared, and/or limited resources. Below is a chart of example resources, or outputs or I/Os and their exclusive versus sharable characteristics, and other related data:

| Resource (I/O) | Vehicle Mic | Vehicle hotspot | Gesture-sensing device | Altimeter |
|---|---|---|---|---|
| Vehicle Embedded Component | √ | √ | | |
| Authorized mobile device Component | | | | √ |
| Add-on Peripheral device Component | | | √ | |
| Exclusive resource | √ | | √ | |
| Sharable resource | | √ | | |
| Current Task Owner | Phone browser app | Phone music streaming app | Vehicle VR app | Vehicle Nav app |

With continued reference to FIG. 7, the functions and components 700 are shown by way of example to include four primary components: a broker 710; a provider 720 (or server, or resource); and two consumers 730, 740 (or tasks, or clients). The bidding broker 710 here can be the same as that described in connection with the broker 612 of FIG. 6.

The broker 710 is in various embodiments a middleware component. The broker 710 performs primary functions of the auction-and-bid protocol. The broker functions are in various embodiments performed with, as part of, or on top of: the group identification 506, the role identification 508, and/or the session maintenance 510 of the process 500 of FIG. 5.

The provider 720 is the component that is to provide a needed resource. The provider 720 can include a gesture-determination device, a microphone, a mobile printer, or a vehicle sensor or other vehicle embedded device 310, for instance.

Consumers 730, 740 are, for instance, programs, apps, or tasks vying for the right to presently use the resource(s) of the provider 720. Example consumers 730, 740 include an application operating at the vehicle 10, or an application operating at an authorized device (e.g., smartphone) 340, or add-on peripheral device 350.

In various embodiments, the provider 720 notifies 721 the broker of the resource or service available. The notification may be generated and provided by a resource state management component 722 of the provider 720. In some embodiments, the notification indicates parameters associated with the offering, such as amount of bandwidth available, an amount of time that the resource is available, other timing by which the bandwidth is available (e.g., start time, frequency of data deliver, etc.), type of data available, the like, or other.

The functions of the broker 710 include collecting bids 712. Bids are requests for a service received from a corresponding consumer bid-submission function 732, 742, as shown.

Decision diamond 714 is a timeout subroutine. At the decision 714, the broker 710 determines whether a pre-established deadline for receiving submissions has expired. The protocol can be programmed to use any time period, here—a second, a portion of a second, or more than a second.

If the deadline has not been reached, the broker 710 continues to collect bids 710.

After the deadline is reached, flow proceeds to block 716 whereat a utility or weighing function is performed to determine which consumer will, for now, receive the resource of the provider 720 bid on.

The utility function in various embodiments includes any suitable function configured to consider variables deemed relevant to the decision by a designer of the protocol. Example considerations include, but are not limited to, an importance of the consumer or task 730, 740 requesting the resource, an amount of bandwidth available from the provider 720, an amount of bandwidth needed by each of the consumers 730, 740, how long the resource is available, how long the resource is needed by each consumer 730, 740, the like, and other. Regarding the importance-of-task variable, a task supporting autonomous driving functions would have a higher importance, or weight, than an entertainment-app task.

While the utility function may be represented in other ways without departing from the scope of the present technology, in one embodiment the utility function is represented by:

$$C_W = \text{Max}\_i\{U_1(v_1), U_2(v_2), \ldots, U_x(v_x)\} \qquad [\text{Eqn. 1}]$$

where:
$C_W$ represents the winner, of the bidding components 730, 740;

i represents the number of consumers, and so the number of times the equation is performed for the comparison of the utility function; i=2 according to the example of FIG. 7;

$v_1 \ldots v_x$ represents x number of considered variables;

$v_1 \ldots v_x$ represents x number of considered variables;

$U_1 \ldots U_y$ represents x number of utilities values, or weights, pre-assigned respectively to the corresponding variables v by a protocol's original designer or later software update.

The winning consumer $C_W$ is the consumer having the highest, or "Max," total value from the function shown in parenthesis, amongst the bidding consumers 730, 740. The total value may be a sum, for instance, as the commas of Eqn. 1 can be addition symbols.

In a contemplated embodiment, the operation 716 of determining the winner bidder includes the consumers providing a value indicating one or more compromising values with respect to at least one variable v. While a consumer may prefer to have a bandwidth of Z, for instance, the bid, or post bid communication, from the consumer may indicate that the bidding consumer would be satisfied if only a certain percentage of the bandwidth sought (e.g., Z(0.75)) was available. Or the bid may include a preferred range, say between 0.75·Z and Z.

In a contemplated embodiment, the operation of collecting bids includes the broker 710 sending at least one follow-on inquiry to one or more of the consumers bidding 730, 740. The inquiry can request, for instance, clarification on a bidding variable, such as information explaining further the consumer's urgency for the resource, the bandwidth amount needed or that would be sufficient for the consumer, the like, or other.

At block 718, the broker 710 sends notification signals or messages to the provider 720 and each bidding consumer 730, 740. The notifications indicate which of the bidding consumers 730, 740 won the present rights to the exclusive or limited resource bid on.

As shown by three notification paths $719_1, 719_2, 719_3$, the broker 710 advises the provider 720 and the consumers 730, 740 of the winning bidder, respectively. For the provider 720, the notification $719_1$ may include a lock notice, advising the provider to lock, or hold, the resource for exclusive provision to the winning bidder. The notification $719_1$ may include parameters for the hold, such as a time at which the hold or data provision from the provider 710 is to start, an identification of the winning consumer 730, the like or other factors.

The provider 720 includes the resource state monitoring component 722 which can include a resource state monitoring component. The component 722

Each consumer includes a decision diamond 734, 744 regarding whether the consumer won or lost the bid. In the example shown, the first consumer shown 730 wins the bid, and at block 736 begins to receive, or have access to the resource or service.

The step 736 in various embodiments includes the winning consumer 730, in response to determining 732 that the consumer 730 won the bid, preparing and sending, to the provider 720, a request or instruction to release the resource requested to the consumer 730.

At block 746, the second consumer 740, which received notification $719_3$ of losing the bidding routine, in some embodiments, seeks a provider or source other than the first provider 720 to satisfy its service need. In various embodiments, the consumer 740, broker 710, and/or CSM facilitates the search. The broker may lead another bidding process, for instance, including the consumer 740 and any other consumer(s). Or the consumer 740 may be the only consumer seeking service from a second, alternative, provider. It is possible that the first provider 720 can be a component of a first device, such as the vehicle, and the second provider, determined to meet the need of the second consumer 740, be from a second device, such as an add-on peripheral 350. Or the second provider could be from the first device.

VIII. Multi-User Hardware Abstraction Layer—FIG. 8

FIG. 8 illustrates operation of a multi-user hardware abstraction layer (HAL) 800 according to embodiments of the present technology.

While the broker, bidding, arrangement of FIG. 7, generally manages situations in which the resource is an exclusive resource and only one consumer can receive service from the resource, the HAL 800 is configured to manage situations in which multiple users, or consumers, can share a resource simultaneously.

The HAL 800 module is configured to manage the sharing of resources without disturbing normal behavior of each or some of the involved components, including the devices at which the resources are implemented. In an example embodiment, in normal behavior of components, at least critical performance is not degraded significantly. In various implementations, critical performances are indicated by any of latency, system throughput, or system overhead.

The HAL 800 in various embodiments is a part of the CSM interface 320.

The HAL 800 works between one or more users or consumers 820, 830, 840 and one or more devices or other resources, which again can be referred to as providers 850, 860.

The HAL 800 includes a primary, multi-user HAL context switch 810. The switch 802 performs functions including managing data streaming and any other data transfer between the consumers 820, 830, 840 and the providers 850, 860. The functions can include data transfer shaping.

The provider 850, 860, or device in which the provider is implemented, in various embodiments includes a device file 852, 862 and a device driver 854, 864. The resource to be shared amongst the consumers in various embodiments is part of the device file.

While a resource, from a provider, can theoretically be share by multiple users simultaneously, the HAL 810, or other component, in various embodiments determines whether the sharing is practical or preferred. The determination may include, for instance, determining whether requirements and/or settings of the consumers 820, 830, 840 and/or abilities of the provider 850, 860, being considered for sharing the resource of the provider 850, 860, do not contradict each other.

For instance, multiple consumers can write to a speaker simultaneously, in a mixed audio arrangement. However, there would be contention in sharing a microphone, assuming the system is regarding the microphone an exclusive audio arrangement. As another example, multiple consumers can record video streams using a single camera, such as by the camera recording more than one video, each having a different resolution. However, there would be contention in one consumer seeking to use a camera to record video while another is using the same camera to take a photo.

In various embodiments, the HAL 810 performs any of a variety of switching functions to coordinate the resource sharing. The HAL 810 may be configured, for instance, to affect a timing by which resources serve the various devices. For instance, when two different consumers—e.g., local devices 34—are each attempting to use a single resource, such as a sensor resource, the scenario is deemed a contradiction. As another example, when the demands of two different consumers, sharing a resource, surpass capability of the shared resource, it is also a contradiction. Only if the system deems that conditions of a present or potential sharing arrangement are not contradictory, the HAL 810 is able to share the resource among the various consumer devices. The sharing may be accomplished using any suitable multi-access mechanism, or pre-determined sharing strategy and schedule, such as a time-division multiplex access (TDMA) mechanism.

IX. Select Advantages

Many of the benefits and advantages of the present technology are described above. The present section restates some of those and references some others. The benefits described are not exhaustive of the benefits of the present technology.

The system by various embodiments adds or enhances capability and performance of the vehicle and mobile or add-on user devices, by facilitating various interactions between vehicle consumers (vehicle apps, etc.) and providers (e.g., vehicle embedded devices such as a vehicle microphone or camera) and the consumers (e.g., mobile phone app, mobile speaker or printer, etc.) and providers (phone altimeter, camera, etc.) of authorized mobile devices (e.g., smartphone) or add-on peripherals (e.g., aftermarket WiFi rear view camera installed at the vehicle, gesture monitoring devices, etc.). For instance, a vehicle can have robust and secure access to resources that the vehicle does not have natively, and mobile or add-on after-market devices can benefit from robust and secure access to resources of the vehicle.

Also, some add-on peripheral devices, which traditionally could not be used with vehicles due to connectivity and/or security concerns, can by the present technology now be leveraged as a resource for the vehicle or be used as an output for a vehicle resource, to meet user needs.

By reliance in some instances on novel wireless connections, such as between the vehicle CRM and CP (e.g., numeral 302 in FIG. 3), wire connections are not needed, as indicated by numeral 303₁. The ability to build with less wires can save in system development cost and space/packaging, for new vehicles or system upgrades, for instance.

X. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A vehicle system, implemented at a subject vehicle, comprising:
   a hardware-based processing unit; and
   a non-transitory computer-readable storage device comprising:
   a device-discovery module that, when executed by the hardware-based processing unit, determines, using a vehicle communication hardware component, presence of one or more proximate devices that are not native to the subject vehicle;
   a service-discovery module that, when executed by the hardware-based processing unit, determines needs of various devices including (i) any of the proximate devices determined present, (ii) a primary vehicle communication interface, (iii) a vehicle consumer-port interface, and (iv) one or more embedded vehicle components;
   a resource-discovery module that, when executed by the hardware-based processing unit, determines one or more resources of the various devices available to serve the needs determined; and
   a grouping module that, when executed by the hardware-based processing unit, establishes, at least temporarily, a first group comprising a vehicle module interface and a vehicle port interface, a second group comprising the vehicle module interface and one or more non-vehicle devices, and a third group comprising the vehicle port interface and one or more non-vehicle devices.

2. The vehicle system of claim 1, wherein the non-transitory computer-readable storage device comprises a role-assignment module that, when executed by the hardware-based processing unit, assigns roles to select devices for meeting determined needs using resources determined.

3. The vehicle system of claim 1, wherein the non-transitory computer-readable storage device comprises a maintenance module that, when executed by the hardware-based processing unit, maintains operations at and/or interactions amongst the grouped devices.

4. The vehicle system of claim 1, wherein the non-transitory computer-readable storage device comprises a soft-state-refresh module that, when executed by the hardware-based processing unit, performs a soft-state refresh operation in connection with the first group, the second group, or the third group established.

5. The vehicle system of claim 1, wherein the non-transitory computer-readable storage device comprises a group-release module that, when executed by the hardware-based processing unit, releases the groups in response to the needs, for which the groups were established, being met.

6. The vehicle system of claim 1, wherein:
the first group, the second group, or the third group include at least two bidding devices having need for a sought resource of the resources; and
the non-transitory computer-readable storage device comprises a broker module that, when executed by the hardware-based processing unit, determines which of the first group, the second group, or the third group will have access to the sought resource.

7. The vehicle system of claim 6, wherein the broker module, upon determining which of the bidding devices will have access to the sought resource, initiates delivery of a notification to each of the bidding devices advising whether the bidding device is being awarded access to the sought resource.

8. The vehicle system of claim 6, wherein the broker module, upon determining which of the bidding devices will have access to the sought resource, initiates delivering, to a resource device to provide the resource, of the first group, the second group, or the third group, a resource notification referencing the bidding device awarded access to the sought resource.

9. The vehicle system of claim 6, wherein the hardware-based processing unit, receives a bid from each of the bidding devices for the sought resource.

10. The vehicle system of claim 6, wherein the broker module, in determining which of the bidding devices will have access to the sought resource, uses an auction-and-bid protocol.

11. The vehicle system of claim 10, wherein the auction-and-bid protocol comprises a utility function configured to determine which of the first group, the second group, or the third group is best to receive access to the sought resource.

12. A non-transitory computer-readable storage device, for use at a vehicle system of a subject vehicle having a communication hardware component, comprising:
a device-discovery module that, when executed by, hardware-based processing unit, determines, using the communication hardware component, presence of one or more proximate devices that are not native to the subject vehicle;
a service-discovery module that, when executed by the hardware-based processing unit of the vehicle system, determines needs of various devices including (i) any of the one or more proximate devices determined present, (ii) a primary vehicle communication interface, (iii) a vehicle consumer-port interface, and (iv) one or more embedded vehicle components;
a resource-discovery module that, when executed by the hardware-based processing unit, determines one or more resources of the various devices available to serve the needs determined; and
a grouping module that, when executed by the hardware-based processing unit, establishes, at least temporarily, a first group comprising a vehicle module interface and a vehicle port interface, a second group comprising the vehicle module interface and one or more non-vehicle devices, and a third group comprising the vehicle port interface and one or more non-vehicle devices.

13. The non-transitory computer-readable storage device of claim 12, wherein the non-transitory computer-readable storage device comprises a role-assignment module that, when executed by the hardware-based processing unit, assigns roles to grouped devices for meeting determined needs using resources determined.

14. The non-transitory computer-readable storage device of claim 12, wherein the non-transitory computer-readable storage device comprises a maintenance module that, when executed by the hardware-based processing unit, maintains operations at and/or interactions amongst the first group, the second group, or the third group.

15. The non-transitory computer-readable storage device of claim 12, wherein the non-transitory computer-readable storage device comprises a soft-state-refresh module that, when executed by the hardware-based processing unit, performs a soft-state refresh operation in connection with the groups established.

16. The non-transitory computer-readable storage device of claim 12, wherein the non-transitory computer-readable storage device comprises a group-release module that, when executed by the hardware-based processing unit, releases the groups in response to the needs, for which the groups were established, being met.

17. The non-transitory computer-readable storage device of claim 12, wherein:
the first group, the second group, or the third group include at least two bidding devices having need for a sought resource of the resources;
the non-transitory computer-readable storage device comprises a broker module that, when executed by the hardware-based processing unit, determines which of the first group, the second group, or the third group will have access to a sought resource of the resources; and
the broker module, in determining which of the bidding devices will have access to the sought resource, uses an auction-and-bid protocol.

18. The non-transitory computer-readable storage device of claim 17, wherein the auction-and-bid protocol comprises a utility function configured to determine which of the first group, the second group, or the third group is best to receive access to the sought resource.

19. The non-transitory computer-readable storage device of claim 17, wherein the hardware-based processing unit, in connection with the auction-and-bid protocol, receives a bid from each of the bidding devices.

20. A method, performed at a subject vehicle system comprising a communication hardware component, comprising:
determining, by a vehicle processing unit executing a device-discovery module of a non-transitory computer-readable storage device, and using the communication hardware component, presence of one or more proximate devices that are not native to the subject vehicle;
determining, by a hardware-based processing unit executing a service-discovery module that, needs of various devices including (i) any of the one or more proximate devices determined present, (ii) a primary vehicle communication interface, (iii) a vehicle consumer-port interface, and (iv) one or more embedded vehicle components;

determining, by a resource-discovery module that, when executed by the hardware-based processing unit, one or more resources of the various devices available to serve the needs determined; and establishing, by a grouping module that, when executed by the hardware-based processing unit, establishes, at least temporarily, a first group comprising a vehicle module interface and a vehicle port interface, a second group comprising the vehicle module interface and one or more non-vehicle devices, and a third group, comprising the vehicle port interface and one or more non-vehicle devices.

* * * * *